United States Patent
Arai et al.

(10) Patent No.: US 7,111,717 B2
(45) Date of Patent: Sep. 26, 2006

(54) POWER TRANSMISSION APPARATUS OF FOUR WHEEL DRIVE APPARATUS

(75) Inventors: Kentarou Arai, Saitama (JP); Koji Kuroda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 104 days.

(21) Appl. No.: 10/963,545

(22) Filed: Oct. 14, 2004

(65) Prior Publication Data
US 2005/0082135 A1 Apr. 21, 2005

(30) Foreign Application Priority Data
Oct. 16, 2003 (JP) .......................... P.2003-355871

(51) Int. Cl.
*B60K 17/35* (2006.01)
(52) U.S. Cl. ...................... 192/35; 192/103 F; 180/249
(58) Field of Classification Search ............... 192/54.3, 192/54.5
See application file for complete search history.

(56) References Cited

U.S. PATENT DOCUMENTS 5,221,101 A * 6/1993 Okubo et al. ............... 180/247
5,244,056 A * 9/1993 Hamada et al. ............. 180/247
6,454,068 B1 * 9/2002 Arai et al. ..................... 192/35
2001/0002629 A1 * 6/2001 Arai et al. .................. 180/233
2003/0085090 A1 * 5/2003 Kasuya et al. ................ 192/35

FOREIGN PATENT DOCUMENTS

EP 1106415 A2 * 6/2001
JP 2001-213185 A 8/2001

* cited by examiner

*Primary Examiner*—Richard M. Lorence
(74) *Attorney, Agent, or Firm*—Westerman, Hattori, Daniels & Adrian, LLP.

(57) ABSTRACT

A power transmission apparatus T of a four wheel drive vehicle is provided with a multiple disc clutch C engaged in accordance with a difference between rotational speeds of a front wheel Wf and a rear wheel Wr and a gear ratio of a second gear mechanism 5 for transmitting rotation of the rear wheel Wr to an output shaft 9 of the multiple disc clutch C is set to be larger than a gear ratio of a first gear mechanism 4 for transmitting rotation of the front wheel Wf to an input shaft 8 of the multiple disc clutch C.

2 Claims, 6 Drawing Sheets

POWER TRANSMISSION APPARATUS OF FOUR WHEEL DRIVE APPARATUS

BACKGROUND OF THE INVENTION

The present invention relates to a power transmission apparatus of a four wheel drive vehicle which includes a front wheel to which a driving force of an engine is directly transmitted, and a rear wheel to which a portion of the driving force of the engine is indirectly transmitted via a multiple disc clutch, and in which the multiple disc clutch is engaged by a hydraulic pressure generated by a hydraulic pump in accordance with a difference between rotational speeds of the front wheel and the rear wheel.

There is publicly known a power transmitting apparatus of such a four wheel drive vehicle provided with a torque cam mechanism for engaging a multiple disc clutch by a thrust force in an axial direction generated in accordance with a difference between rotational speeds of a first cam member moved in cooperation with rotation of a front wheel and a second cam member moved in cooperation with rotation of a rear wheel to promote response until a four wheel drive state is brought about after generating the differences between the rotational speeds of the front and the rear wheels by Patent Reference 1, shown below.

[Patent Reference 1]
 JP-A-2001-213185

Meanwhile, although in running a vehicle forward at a constant speed, a rotational speed of a front wheel and a rotational speed of a rear wheel are to be the same, there is a case in which the rotational speed of the front wheel exceeds the rotational speed of the rear wheel by a difference in a small slip rate between the front and the rear wheels by a running resistance or the like, at this occasion, according to the power transmission apparatus of the four wheel drive vehicle described in Patent Reference 1, the multiple disc clutch is engaged to bring about an unnecessary four wheel drive state, further, a transmitting torque of the multiple disc clutch is amplified since the power transmission apparatus is provided with the torque cam mechanism and therefore, there poses a problem of increasing a fuel consumption amount of the engine. Further, a frequency of bringing about the four wheel drive state is increased and therefore, an extra strength needs to set in order to ensure durability of a drive system to pose a problem of causing an increase in weight of the drive system and an increase in cost.

SUMMARY OF THE INVENTION

The invention is carried out in view of the above-described situation and it is an object thereof to prevent an unnecessary four wheel drive state by engaging a multiple disc clutch from being brought in running forward at a constant speed.

In order to achieve the above-described object, according to the invention described in Aspect 1, there is proposed a power transmission apparatus of a four wheel drive vehicle including a front wheel to which a driving force of an engine is directly transmitted, and a rear wheel to which a portion of the driving force of the engine is indirectly transmitted via a multiple disc clutch, wherein the multiple disc clutch is engaged by a hydraulic pressure generated by a hydraulic pump in accordance with a difference between rotational speeds of the front wheel and the rear wheel, the power transmission apparatus of a four wheel drive vehicle including a first cam member moved in cooperation with rotation of the front wheel and a second cam member moved in cooperation with rotation of the rear wheel and a torque cam mechanism for engaging the multiple disc clutch by a thrust force in an axial direction generated in accordance with a difference between rotational speeds of the first cam member and the second cam member, wherein the torque cam mechanism generates the thrust force when the rotational speed of the front wheel exceeds the rotational speed of the rear wheel in running the vehicle forward and does not generate the thrust force when the rotational speed of the rear wheel exceeds the rotational speed of the front wheel in running the vehicle forward, and a gear ratio of a second gear mechanism for transmitting rotation of the rear wheel to the second cam member via a second differential apparatus is set to be larger than a gear ratio of a first gear mechanism for transmitting rotation of the front wheel to the first cam member via a first differential apparatus.

Further, a first and a second hydraulic pump Pf, Pr of an embodiment correspond to the hydraulic pump of the invention.

According to the constitution of Aspect 1, since the gear ratio of the second gear mechanism for transmitting rotation of the rear wheel to the second cam member of the multiple disc clutch via the second differential apparatus is set to be larger than the gear ratio of the first gear mechanism for transmitting rotation of the front wheel to the first cam member of the multiple disc clutch via the first differential apparatus and therefore, even when the rotational speed of the front wheel which is inherently to be the same as the rotational speed of the rear wheel more or less exceeds the rotational speed of the rear wheel by some reason in running the vehicle forward at a constant speed, a fuel consumption amount can be saved by preventing the vehicle from being brought into an unnecessary four wheel drive state by hampering the multiple disc clutch from being engaged by preventing the rotational speed of the first cam member of the multiple disc clutch from exceeding the rotational speed of the second cam member. Particularly, according to the multiple disc clutch having the torque cam mechanism, the transmitting torque rapidly rises at an instance of generating a difference between the rotational speeds of the first and the second cam members and therefore, the effect of preventing the multiple disc clutch from being engaged in running the vehicle forward at a constant speed becomes further significant. Further, a frequency of bringing about the four wheel drive state is reduced and therefore, it is not necessary to set an excessive strength for ensuring durability of a drive system, which can not only contribute to a reduction in a weight of the drive system and a reduction in cost but also promote durability of the multiple disc clutch.

DETAILED DESCRIPTION OF THE PREFERRED EMBODIMENTS

An embodiment of the invention will be explained based on an example of the invention shown by attached drawings as follows.

Figure 1:
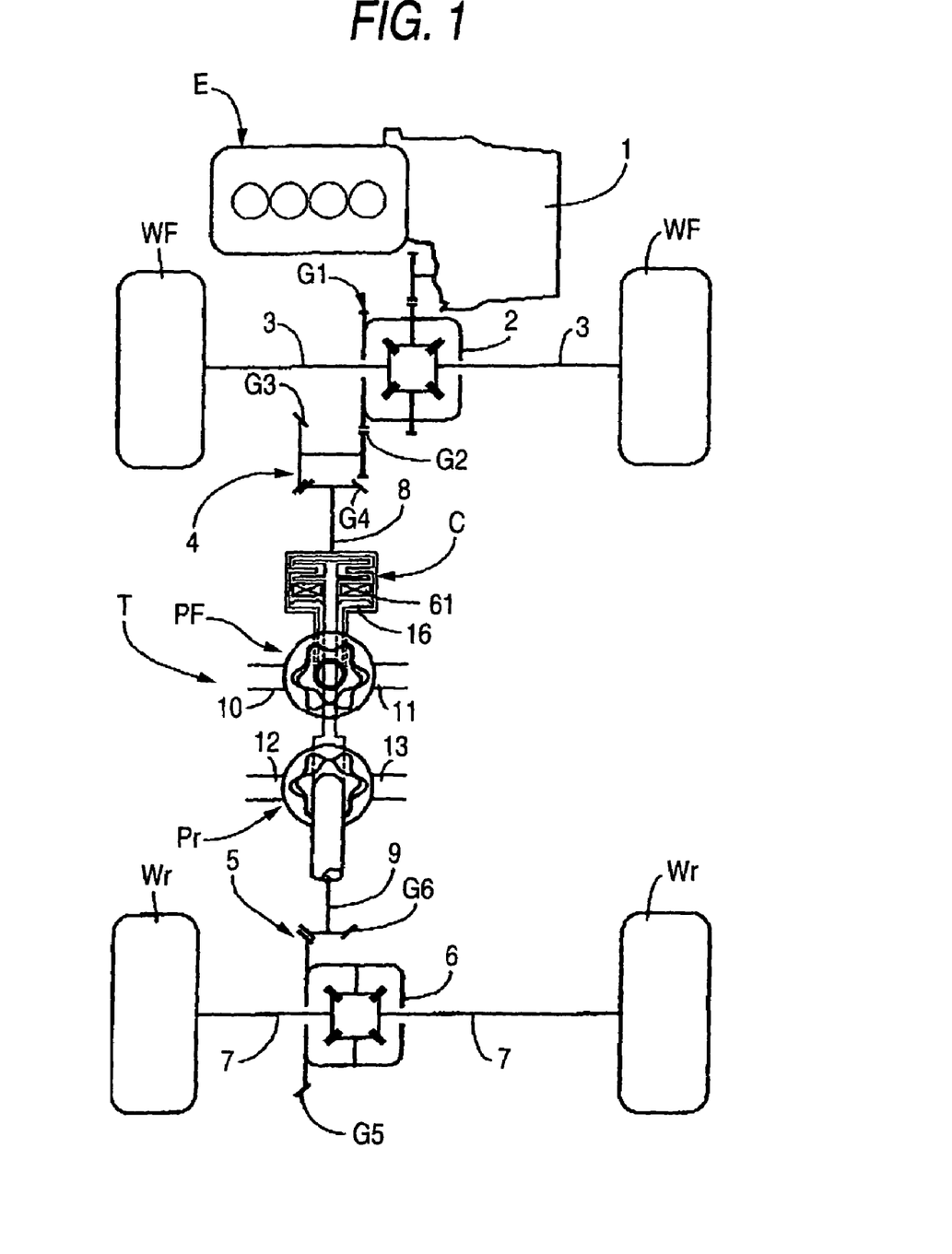
FIG. 1 is a diagram showing a power transmission system of a four wheel drive vehicle.
Figure 2:
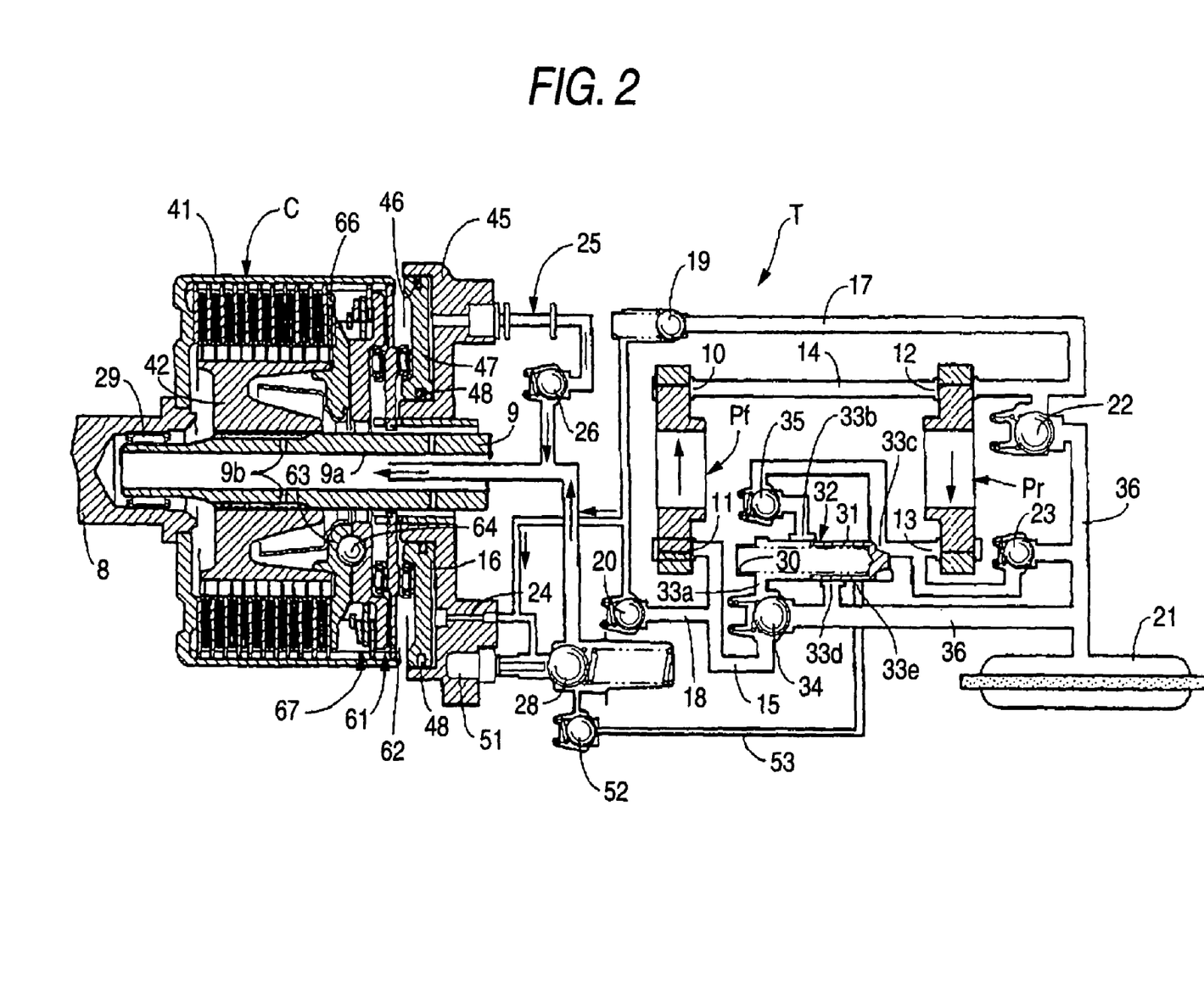
FIG. 2 is a view showing structures of a multiple disc clutch and a hydraulic circuit of the four wheel drive vehicle.
Figure 3:
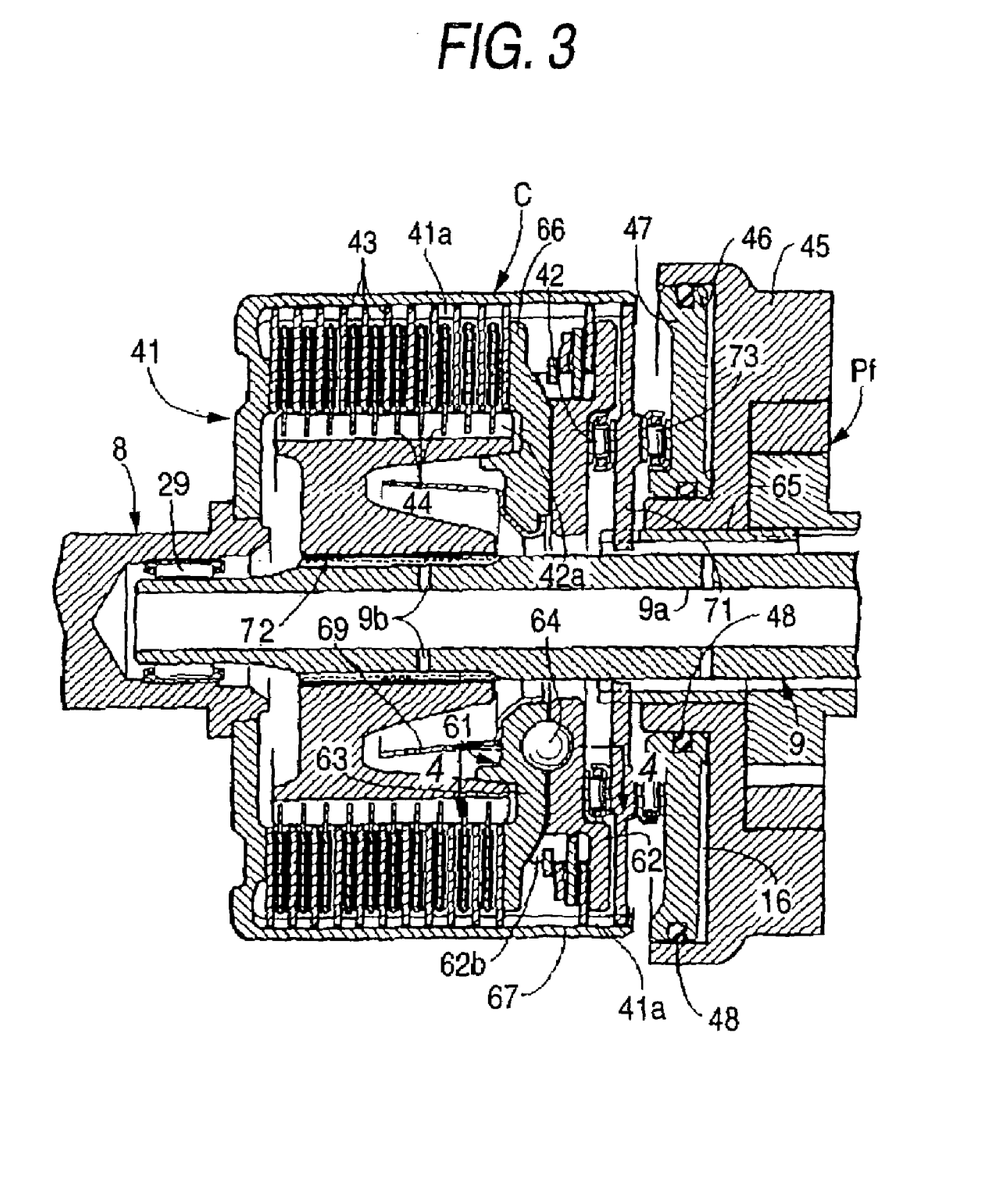
FIG. 3 is a sectional view enlarging the multiple disc clutch.
Figure 4:
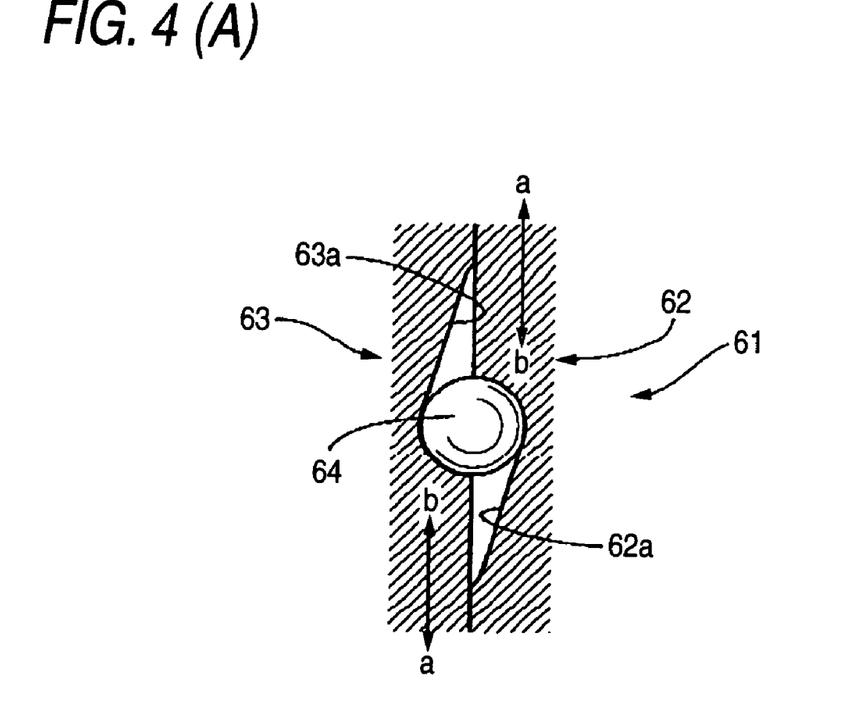
FIGS. 4A and 4B illustrate enlarged sectional views taken along a line 4—4 of FIG. 3.
Figure 5:
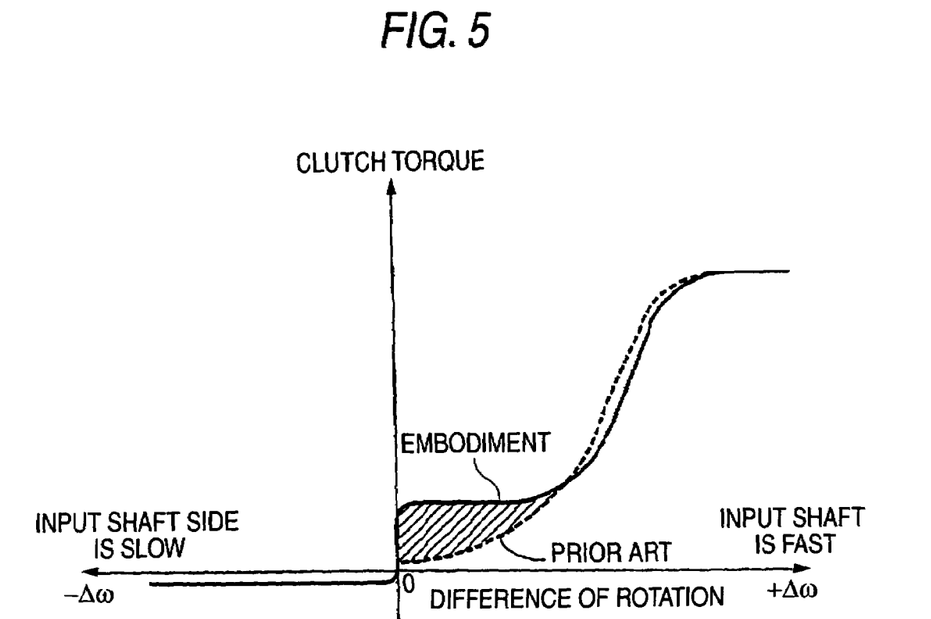
FIG. 5 is a graph showing a relationship between a difference between rotational speeds of an input shaft and an output shaft and a transmitting torque of the multiple disc clutch.
Figure 6:
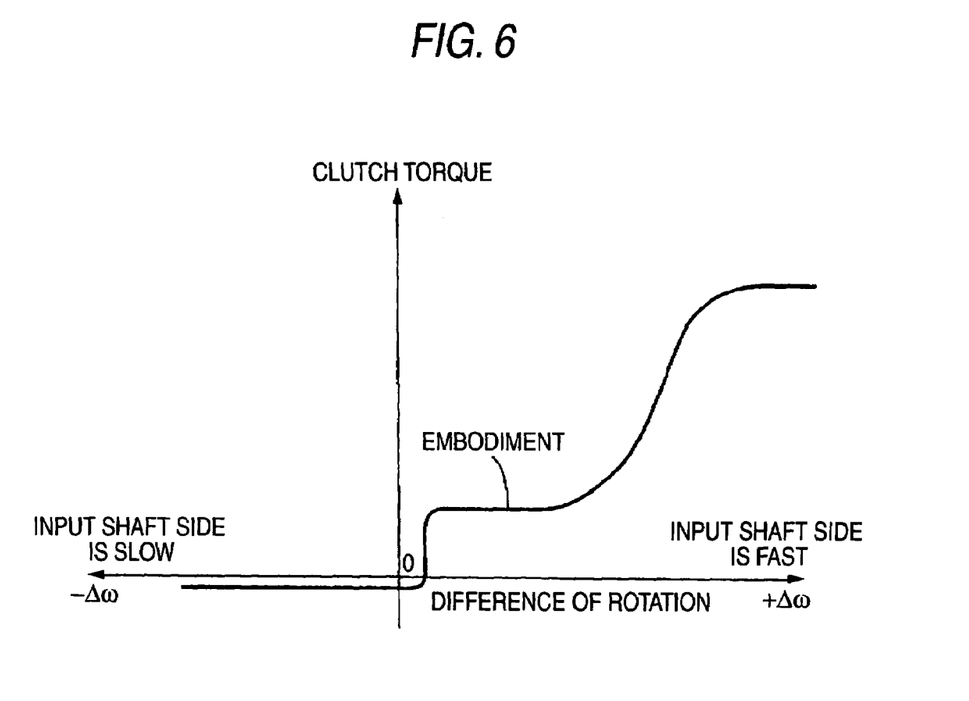
FIG. 6 is a graph showing a relationship between a difference between rotational speeds of a front wheel and a rear wheel and the transmitting torque of the multiple disc clutch.

FIG. 1 through FIG. 6 show an embodiment of the invention, FIG. 1 is a view showing a power transmitting system of a four wheel drive vehicle, FIG. 2 is a view showing structures of a multiple disc clutch and a hydraulic circuit of the four wheel drive vehicle, FIG. 3 is a sectional view enlarging the multiple disc clutch, FIGS. 4A and 4B illustrate enlarged sectional views taken along a line 4—4 of FIG. 3, FIG. 5 is a graph showing a relationship between a difference between rotational speeds of an input shaft and an output shaft and a transmitting torque of the multiple disc clutch, and FIG. 6 is a graph showing a relationship between a difference between the rotational speeds of a front wheel and a rear wheel and the transmitting torque of the multiple disc clutch.

As shown by FIG. 1, an output of an engine E mounted to a front portion of a four wheel drive vehicle is inputted to a first differential apparatus 2 on a side of a front wheel via a transmission 1, and an output of the first differential apparatus 2 is transmitted to left and right front wheels Wf, Wf via drive shafts 3, 3. The output of the engine E inputted to the first differential apparatus 2 is inputted to a power transmission apparatus T, mentioned later, via a first gear mechanism 4 including the first differential apparatus 2, and an output of the power transmission apparatus T is transmitted to a second gear mechanism 5 including a second differential apparatus 6 on a side of a rear wheel and is transmitted therefrom to left and right rear wheels Wr, Wr via drive shafts 7, 7.

The power transmission apparatus T is constituted by a first hydraulic pump Pf driven by an input shaft 8 extended from the first gear mechanism 4, a second hydraulic pump Pr driven by an output shaft 9 connected to the second gear mechanism 5, and a wet type multiple plate clutch C governing to transmit and cut a drive force between the input shaft 8 and the output shaft 9, and a hydraulic circuit, mentioned later, for controlling the multiple plate clutch C.

The first gear mechanism 4 is constituted by a first gear G1, a second gear G2, a third gear G3 and a fourth gear G4, and a gear ratio $\alpha$ of the first gear mechanism 4 for transmitting the drive force from the front wheels Wf, Wf to the power transmission apparatus T is defined by $\alpha$=(tooth number of first gear G1/tooth number of second gear G2)×(tooth number of third gear G3/tooth number of fourth gear G4) Further, the second gear mechanism 5 is constituted by a fifth gear G5 and a sixth gear G6, and a gear ratio $\beta$ of the second gear mechanism for transmitting the drive force from the gear wheels Wr, Wr to the power transmission apparatus T is defined by $\beta$=tooth number of fifth gear G5/tooth number of sixth gear G6.

Further, the gear ratio $\alpha$ of the first gear mechanism 4 and the gear ratio $\beta$ of the second gear mechanism 5 are not the same but is set to $\alpha<\beta$. According to the embodiment, $\alpha$=2.5421, $\beta$=2.5625, and $\alpha/\beta$=0.992. Therefore, even when the front wheels Wf, Wf and the rear wheels Wr, Wr are rotated at the same speed, a rotational speed of the output shaft 9 of the power transmission apparatus T becomes slightly larger than a rotational speed of the input shaft 8. It is preferable that a difference between the rotational speeds falls in a range of 0.5% through 1.0%.

Next, constitutions of the multiple disc clutch C and the hydraulic circuit will be explained in reference to FIG. 2 and FIG. 3. The first hydraulic pump Pf comprises a trochoid pump and includes a first port 10 which becomes a delivery port when the vehicle is moved forward and a suction port when the vehicle is moved rearward, and a second port 11 which becomes a suction port when the vehicle is moved forward and a delivery port when the vehicle is moved rearward. The second hydraulic pump Pr similarly comprises a trochoid pump and includes a third port 12 which becomes a suction port when the vehicle is moved forward and a delivery port when the vehicle is moved rearward, and a fourth port 13 which becomes a delivery port when the vehicle is moved forward and a suction port when the vehicle is moved rearward. With regard to delivery amounts per rotation of the two hydraulic pumps Pf, Pr, the delivery amount of the second hydraulic pump Pr is set to be larger than that of the first hydraulic pump Pf slightly (for example, by 2.5%) Further, the first port 10 and the third port 12 are connected via a first connecting oil path 14, and the second port 11 and the fourth port 13 are connected via a second connecting oil path 15. Further, delivery directions of the two hydraulic pumps Pf, Pr comprising the trochoid pumps are determined by rotational directions thereof and therefore, the delivery direction is reversed when the vehicle is moved forward and when the vehicle is moved rearward. Arrow marks of the two hydraulic pumps Pf, Pr in FIG. 2 respectively show the delivery directions when the vehicle is moved forward.

The multiple disc clutch C is provided with a clutch housing 41 fixedly attached to the input shaft 8, and a clutch hub 42 fitted to a rear end of the input shaft 8 coaxially and relatively rotatably via a roller bearing 29, and a plurality of sheets of clutch plates 43 . . . slidably supported by a spline 41a formed at an inner periphery of the clutch housing 41, and a plurality of sheets of clutch plates 44 . . . slidably supported by a spline 42a formed at an outer periphery of the clutch hub 42, are overlapped to be able to be brought into contact with each other. A clutch cylinder 46 formed at a casing 45 is slidably fitted with a clutch piston 47 via seal members 48, 48 and a right side face of the clutch piston 47 is formed with an operational hydraulic chamber 16 applied supplied with pressurized oil for driving the clutch piston 47.

A torque cam mechanism 61 arranged at a rear portion of the multiple disc clutch C is constituted by a first cam member 62, a second cam member 63 and a plurality of cam balls 64 . . . . The first cam member 62 disposed on a rear side is a member substantially in a ring-like shape and is supported by a rear portion of the clutch housing 41 movably in an axial direction. The second cam member 63 is a member substantially in a ring-like shape overlapped to a front face of the first cam member 62 movably in the axial direction, and is provided with a pressing portion 66 for pressing the clutch plates 43 . . . , 44 . . . of the multiple disc clutch C in a forward direction to be engaged with each other.

A friction clutch 67 is arranged between a spline 62b and the spline 41a of the clutch housing 41. The friction clutch 67 is made to be slipped when a torque equal to or larger than a predetermined value is operated between the first cam member 62 and the clutch housing 41. On a rear side of the torque cam mechanism 61, an end plate 71 is supported between the spline 41a of the clutch housing 41 and a sleeve 65 continuous to the first oil pressure Pf movably in the axial direction and relatively unmovably, a thrust bearing 72 is arranged between a front face of the end plate 71 and a rear face of the first cam member 62, and a thrust bearing 73 is arranged between a rear face of the end plate 71 and the front face of the clutch piston 47.

By the above-described constitution, when relative rotation is brought about between the front wheels Wf, Wf and the rear wheels Wr, Wr and the torque cam mechanism 61 is operated, the multiple disc clutch C is engaged by a thrust force f (refer to FIG. 4) generated by relative rotation of the first cam member 62 and the second cam member 63. Although even after the relative rotation between the first cam member 62 and the second cam member 63 is restricted, the relative rotation between the front wheels Wf, Wf and the rear wheels Wr, Wr is further continued, relative rotation of the clutch housing 41 and the first cam member 62 is permitted by slipping the friction clutch 67 and relative rotation of the end plate 71 rotated integrally with the clutch housing 41 and the first cam member 62 rotated integrally with the clutch hub 42 is permitted by operation of the thrust bearing 72. Further, the thrust bearing 73 arranged between the clutch piston 47 and the end plate 71 permits relative rotation of the end plate 71 relative to the clutch piston 47 which is not rotated relative to the housing 45.

A cone member 69 extended from the second cam member 63 to an inner portion of the clutch hub 42 is provided with a number of small holes and is provided with a function of uniformly lubricating the clutch plates 43 . . . , 44 . . . of the multiple disc clutch C by dispersing the lubricant supplied from an oil path 9a and oil holes 9b . . . by a centrifugal force. In this case, the output shaft 9 may be constituted by a solid shaft, an oil path may be formed between the output shaft 9 and the sleeve 65 and lubrication may be carried out via the cone member 69.

As is apparent from FIG. 4, faces of the first cam member 62 and the second cam member 63 of the torque cam mechanism 61 opposed to each other are formed with respective 6 pieces of recessed portions 62a . . . , 63a . . . at intervals of 60° and the cam balls 64 . . . are contained between pairs of the recessed portions 62a . . . , 63a . . . constituting pairs. According to shapes of the recessed portions 62a . . . , 63a . . . , deep portions for containing halves of the cam balls 64 . . . and portions of gradually reducing depths thereof are continuously formed and when the first cam member 62 and the second cam member 63 are brought into a phase relationship of FIG. 4A, the first and the second cam members 62, 63 become proximate to each other and the opposed faces are brought into close contact with each other. When the first and the second cam members 62, 62 are relatively rotated in an arrow mark a direction, the thrust force f in the axial direction is generated at the first and the second cam members 62, 63 by operation of the shapes of the recessed portions 62a . . . , 63a . . . and the first and the second cam members 62, 63 are moved relatively in directions of being remote from each other as shown by FIG. 4B.

Further, in the case in which the first cam member 62 and the second cam member 63 are brought into the phase relationship of FIG. 4A, even when the first and the second cam members 62, 63 are going to be rotated relatively in an arrow mark b direction, relative rotation of the first and the second cam members 62, 63 in the arrow mark b direction is restricted by operation of the shapes of the recessed portions 62a . . . , 63a . . . and the thrust force f in the axial direction is not generated. That is, the torque cam mechanism 61 is also provided with a function of a one way cam.

As is apparent from FIG. 2, the operational hydraulic chamber 16 of the multiple disc clutch C and the first connecting oil path 14 are connected via a third connecting oil path 17, and the operational hydraulic chamber 16 and the second connecting oil path 15 are connected via a fourth connecting oil path 18. The third connecting oil path 17 is provided with a first one way valve 19 for permitting only a flow of oil from the second hydraulic pump Pr to the operational hydraulic chamber 16, and the fourth connecting oil path 18 is provided with a second one way valve 20 for permitting only a flow of oil from the second connecting oil path 15 to the operational hydraulic chamber 16. Further, a fifth connecting oil path 36 for connecting an oil tank 21 and the first connecting oil path 14 and the second connecting oil path 15 is respectively provided with a third one way valve 22 for permitting only a flow of oil from the oil tank 21 to the first connecting oil path 14 and a fourth one way valve 23 for permitting only a flow of oil from the oil tank 21 to a port 33c.

A position upstream from the operational hydraulic chamber 16 of the multiple disc clutch C is provided with a choke type throttle 24. Further, positions downstream from the operational hydraulic chamber 16 are provided in series with an orifice type throttle 25 and a first relief valve 26, and a side downstream from the orifice type throttle 25 and the first relief valve 26 is connected to the oil path 9a formed at inside of the output shaft 9. The oil path 9a is communicated with the lubricating portion of the multiple disc clutch C, that is, an inner space of the clutch housing 41 containing the clutch plates 43 . . . , 44 . . . via the plurality of oil holes 9b . . . penetrating the output shaft 9 in a radius direction.

The first relief valve 26 is provided with a function of preventing air from flowing back from the lubricating portion of the multiple disc clutch C to the operation hydraulic chamber 16 when the clutch piston 47 of the multiple disc clutch C is swung by eccentric rotation of the input shaft 8 and the output shaft 9.

An interval between a position upstream from the choke type throttle 24 and a position downstream from the orifice type throttle 25 is provided with a second relief valve 28 for restricting an upper limit value of a hydraulic pressure transmitted to the operational hydraulic chamber 16. The second relief valve 28 is provided with a thermoswitch 51 for forcibly opening the second relief valve 28 when oil temperature rises.

The second connecting oil path 15 is provided with a spool valve 32 constituted by containing a spool 31 urged in the right direction by a spring 30 at inside of the housing. When the spool 31 is disposed at an illustrated right position, communication between the port 33c and a port 33d is cut by the spool 31 and a port 33a and a port 33b are communicated, and when the spool 31 is moved to a left position against the spring 30, communication between the port 33a and the port 33b is cut and the port 33c and the port 33d are communicated. An interval between the port 33a and the port 33d is provided with a fifth one way valve 34 for permitting only a flow of oil from the port 33d to the port 33a, and an interval between the port 33b and the port 33c are provided with a sixth one way valve 35 for permitting only a flow of oil from the port 33b to the port 33c.

Therefore, when the vehicle is moved forward, that is, when the fourth port 13 of the second hydraulic pump Pr delivers oil, the spool 31 is moved to the left position and the second communicating oil path 15 and the first communicating oil path 14 are connected by communicating the port 33c and the port 33d. Further, when the vehicle is moved rearward, that is, when the second port 11 of the first hydraulic pump Pf delivers oil, the spool 31 is disposed at the illustrated right position and the second connecting oil path 15 and the first connecting oil path 14 are connected by communicating the port 33a and the port 33b.

When the spool 31 of the spool valve 32 is disposed at the right position, a port 33e communication with the port 33c of which is cut by the spool 31 is communicated with the oil path 9a via a lubricating oil path 53 provided with a seventh one way valve 52.

Next, operation of the above-described embodiment of the invention will be explained.

In starting to move forward, the drive force of the engine E is transmitted to the front wheels Wf, Wf via the first differential apparatus 2 and the drive shafts 3, 3, the drive force is transmitted to the first hydraulic pump Pf via the first gear mechanism 4 and the input shaft 8 to drive the first hydraulic pump Pf. At this occasion, the multiple disc clutch C is brought into an unengaged state and the second hydraulic pump Pr connected to the output shaft 9 is brought into a stationary state. Therefore, oil sucked from the oil tank 21 to the second port 11 of the first hydraulic pump Pf via the fifth one way valve 34 is delivered from the first port 10 to the first connecting oil path 14. At this occasion, the third one way valve 22 of the fifth connecting oil path 36 is closed and therefore, a total amount of oil delivered to the first connecting oil path 14 flows into the third connecting oil path 17 and hampered by the second one way clutch 20 there and is supplied to the operational hydraulic chamber 16 of the multiple disc clutch C via the first one way valve 19 and the choke type orifice 24.

When the multiple disc clutch C is engaged as described above, the rear wheels Wr, Wr are driven via the output shaft 9, the second gear mechanism 5 and the drive shafts 7, 7 and the second hydraulic pump Pr connected to the output shaft 9 is rotated. As a result, oil delivered from the first hydraulic pump Pf is sucked by the second hydraulic pump Pr via the first connecting oil path 14 in accordance with an increase in the rotational speeds of the rear wheels Wr, Wr, and oil delivered from the second pump Pr is sucked by the first hydraulic pump Pf via the ports 33c, 33d and the first one way valve 34 while moving the spool 31 of the spool valve 32 to the left against the spring 30. Further, the hydraulic pressure operated to the operational hydraulic chamber 16 of the multiple disc clutch C, that is, a force of engaging the multiple disc clutch C is automatically changed in accordance with a difference between a delivery amount of the first hydraulic pump Pf and a suction amount of the second hydraulic pump Pr, and when, for example, a forward constant speed running state in which the difference between the rotational speeds between the front and rear wheels becomes substantially null is reached, the hydraulic pressure is not operated to the operational hydraulic chamber 16 of the multiple disc clutch C and distribution of torque to the rear wheels Wr, Wr is cut. Further, although in the forward constant speed state running state, as described above, the delivery amount of the second hydraulic pump Pr is slightly larger than the delivery amount of the first hydraulic pump Pf, oil delivered from the second hydraulic pump Pr moves the spool 31 of the spool valve 32 to the left against the spring 30 and excessive oil delivered from the second hydraulic pump Pr is recirculated to the third port 12 of the second hydraulic pump Pr via the ports 33c, 33d and the third one way valve 22 of the fifth connecting oil path 36.

In the above-described forward constant speed running state, when oil delivered from the first hydraulic pump Pf and the second hydraulic pump Pr is circulated to the first connecting oil path 14 and the second connecting oil path 15, by moving the spool 31 of the spool valve 32 to the left against the spring 30 by oil delivered from the second hydraulic pump Pr, the hydraulic pressure in accordance with the urged force of the spring 30 is generated at the second connecting oil path 15 between the fourth port 13 and the port 33c. As a result, air sucked from side clearances of rotors of the two hydraulic pumps Pf, Pr into circulating oil is compressed by the hydraulic pressure and is successively exhausted from a side clearance proximate to the fourth port 13 of the second hydraulic pump Pr and therefore, air is not stagnant in circulating oil. Thereby, there can firmly be prevented a drawback that when the difference between the rotational speeds of the front wheels Wf, Wf and rear wheels Wr, Wr is brought about thereafter and a difference is brought about between the delivery amounts (suction amounts) of the first and the second hydraulic pumps Pf, Pr, rise of the hydraulic pressure is retarded by the stagnant air, as a result, a delay is brought about in response of the multiple disc clutch C.

Now, when the difference between the delivery amounts (suction amounts) of the first and the second hydraulic pumps Pf, Pr is brought about, a hydraulic pressure in correspondence with the set load of the first relief valve 26 is immediately operated to the operational hydraulic chamber 16 of the multiple disc clutch C. After opening the first relief valve 26, a hydraulic pressure determined by the difference between the delivery amounts of the first and the second hydraulic pumps Pf, Pr, a characteristic of pressure drop of the orifice type throttle 25 and the choke type throttle 24, or viscosity of oil or the like is operated to the operational hydraulic chamber 16 of the multiple disc clutch C. Further, since the upper limit value of the oil pressure is restricted by the set load of the second relief valve 28, an upper limit of the transmitting torque of the multiple disc clutch C can be adjusted by pertinently setting the set load of the second relief valve 28.

Meanwhile, an amount of oil passing the choke type throttle 24 is influenced by the viscosity of oil, the oil amount flowing through the choke type throttle 24 is reduced when the viscosity of oil is increased in a low temperature state and therefore, also an oil amount passing the operational hydraulic chamber 16 of the multiple disc clutch C and the orifice type throttle 25 is reduced. At this occasion, an amount of pressure drop generated before and after the orifice type throttle 25 is proportional to a square of the oil amount passing the orifice type throttle 25 and therefore, when the passing oil amount is reduced, the amount of pressure drop of the orifice type throttle 25 is reduced and the amount of the pressure drop at the choke type throttle 24 on the upstream side is increased by that amount. Thereby, a pressure constituted by subtracting the amount of the pressure drop by the choke type throttle 24 from the hydraulic pressure operated to the operational hydraulic chamber 16 in the low temperature state, that is, the pressure set by the second relief valve 28 is reduced. Therefore, even when a friction coefficient is increased by increasing the viscosity of oil, a force of pressing the clutch plate 43 . . . , 44 . . . by the hydraulic pressure is reduced by that amount and a force of engaging the multiple disc clutch C in the low temperature state is prevented from being increased as a whole. Meanwhile, although in a high temperature state, the viscosity of oil is reduced and the friction coefficient is reduced, in this case, the amount of the pressure drop by the choke type throttle 24 is conversely reduced and the hydraulic pressure operated to the operational hydraulic chamber 16 of the multiple disc clutch C is increased and therefore, the force of pressing the clutch plates 43 ..., 44 ... is increased by that amount to thereby prevent a force of engaging the multiple disc clutch C from being reduced.

Further, in starting to move the vehicle forward and in rapidly accelerating the vehicle forward, oil exhausted from the operational hydraulic chamber 16 of the multiple disc clutch C via the orifice type throttle 25 and the first relief valve 26 and oil exhausted from the position upstream from the poperational hydraulic chamber 16 via the second relief valve 28 are supplied from the oil path 9a and the oil holes 9b ... of the output shaft 9 to inside of the multiple disc clutch C and is scattered there from the oil holes of the cone member 69 rotating relative to the output shaft 9 to the outer side in the radius direction by the centrifugal force to uniformly lubricate the respective clutch plates 43 ..., 44 .... Oil which has lubricated the clutch plates 43 ..., 44 ... is recirculated to the oil tank 21 by passing an oil path, not illustrated.

Meanwhile, as described above, in forward constant speed running of the vehicle, pressurized oil is not supplied to the operational hydraulic chamber 16 of the multiple disc clutch C and therefore, the lubricant is not supplied to the lubricating portion of the multiple disc clutch C by way of the operational hydraulic chamber 16. However, when the vehicle is run forward at constant speed, predetermined oil pressure is generated when oil delivered from the fourth port 13 of the second hydraulic pump Pr moves the spool 31 of the spool valve 32 to the left against the spring 30, further, by the difference between the delivery amounts per rotation of the two hydraulic pumps Pf, Pr, excess oil is delivered to the second connecting oil path 15 and therefore, a portion of the excess oil is supplied from the lubricating oil path 53 to the oil path 9a of the output shaft 9 by a pressure generated when the spool valve 32 is opened and is supplied therefrom to the lubricating portion of the multiple disc clutch C via the oil holes 9b ... In this way, even in the forward constant speed running in which the multiple disc clutch C is brought into the unengaged state, the clutch plates 43 ..., 44 ... can effectively be lubricated by supplying the lubricant to the lubricating portion of the multiple disc clutch C, thereby, overheat of the multiple disc clutch C can be prevented.

Further, the seventh one way valve 52 provided at the lubricant path 53 achieves the following function. That is, when negative pressure is generated at the second connecting oil path 15 in starting to move the vehicle forward or in rapidly accelerating the vehicle forward, air sucked from the lubricating portion of the multiple disc clutch C can be prevented from being sucked into the first hydraulic pump Pf via the lubricating oil path 53, the port 33e, the port 33d, the fifth one way valve 34 and the second connecting oil path 15.

When only the front wheels Wf, Wf tread on a road face having a low friction coefficient in running forward at a constant speed, or when the vehicle is going to accelerate rapidly, there is a case in which the front wheels Wf, Wf is transiently brought into a slipping state. In such a state, the delivery amount of the first hydraulic pump Pf connected to the input shaft 8 exceeds the suction amount of the second hydraulic pump Pr connected to the output shaft 9, further, the third one way valve 22 is closed to hamper communication between the first connecting oil path 14 and the second connecting oil path 15 via the fifth connecting oil path 36 and therefore, similar to the above-described the multiple disc clutch C is engaged and the drive torque is distributed to the rear wheels Wr, Wr.

When a braking force is operated to the wheel, in distributing the braking force to the front and rear wheels, generally, the braking force is distributed to the side of the front wheels Wf, Wf higher than the side of the rear wheels Wr, Wr and therefore, in rapid braking, the front wheels Wf, Wf are locked prior to the rear wheels Wr, Wr. Further, engine brake from running at a constant speed is operated only to the front wheels Wf, Wf and therefore, also in this case, transiently, the rotational speed of the front wheels Wf, Wf becomes lower than that of the rear wheels Wr, Wr. In such a case, the delivery amount of the second hydraulic pump Pr exceeds the suction amount of the first hydraulic pump Pf, and excess oil is delivered to the second connecting oil path 15. Further, when the front wheels Wf, Wf are completely locked, the first hydraulic pump Pf is stopped and only the second hydraulic pump Pr is rotated and therefore, a total amount of oil delivered from the second hydraulic pump Pr becomes excessive. However, the excess delivered oil is recirculated to the third port 12 of the second hydraulic pump Pr via the port 33c, the port 33d of the spool valve 32 and the third one way valve 22 of the fifth connecting oil path 36. In this way, even when the rotational speed of the rear wheels Wr, Wr exceeds the rotational speed fo the front wheels Wf, Wf, the operating hydraulic chamber 16 of the multiple disc clutch C is not operated with the hydraulic pressure based on the difference between the delivery amounts of the first and the second hydraulic pumps Pf, Pr and therefore, the multiple disc clutch C is maintained in an unengaged state to hamper the braking force from being transmitted from the front wheels Wf, Wf to the rear wheels Wr, Wr, thereby, the braking force distribution of the front and rear wheels remains unchanged.

Further, since the multiple disc clutch C is not engaged in braking the vehicle forward as described above, the multiple disc clutch C is not lubricated by oil passing the first relief valve 26. However, similar to the case of running the vehicle forward at a constant speed as described above, a portion of oil delivered from the second hydraulic pump Pr is supplied to the multiple clutch C via the spool valve 32 and the lubricating oil path 53 and the lubricating portion of the multiple disc clutch C is lubricated without a hindrance.

In moving the vehicle rearward, both of the rotational directions of the first and the second hydraulic pumps Pf, Pr are reversed and the relationship between the delivery ports and the suction ports becomes a relationship reverse to the above-described.

That is, when the rotational speed of the front wheels Wf, Wf exceeds the rotational speed of the rear wheels Wr, Wr is starting to move the vehicle rearward or in rapidly accelerating the vehicle rearward, the delivery amount of the first hydraulic pump Pf exceeds the suction amount of the second hydraulic pump Pr and therefore, the hydraulic pressure is generated at the second connecting oil path 15. At this occasion, the spool 31 of the spool valve 32 is maintained at the illustrated position by the spring 30, oil delivered to the second connecting oil path 15 by the difference between the delivery amount from the second port 11 of the first hydraulic pump Pf and the suction amount of the fourth port 13 of the second hydraulic pump Pr is hampered from flowing into the fifth connecting oil path 36 by the fourth one way valve 23 and the fifth one way valve 34 to flow into the fourth connecting oil path 18, passes the second one wary valve 20 there and hampered by the first one way valve 19 to be supplied to the operational hydraulic chamber 16 of the multiple disc clutch C and the multiple disc clutch C is engaged to distribute the drive torque to the rear wheels Wr, Wr. When the rotational speed of the rear wheels, Wr, Wr is increased to bring about a state of running the vehicle rearward at a constant speed, the rotational speeds of the first hydraulic pump Pf and the second hydraulic pump Pr become the same, since the delivery amount per rotation of the second hydraulic pump Pr is larger than the delivery amount per rotation of the first hydraulic pump Pf, oil in correspondence with the difference is supplied to the first connecting oil path 14. As a result, in moving the vehicle rearward, even in the constant speed running state, the torque is distributed from the side of the front wheels Wf, Wf to the side of the rear wheels Wr, Wr.

In the rearward constant speed running state, oil circulating in a circulating oil path comprising the first connecting oil path 14 and the second connecting oil path 15 is not operated with a load by the spring 30 of the spool valve 32. However, generally, the rearward constant speed running state does not continue for a long period of time and therefore, sucking of air from the side clearances of the rotor of the two hydraulic pumps Pf, Pr and stop of supplying the lubricant to the multiple disc clutch C do not pose a problem substantially.

Further, in rearward braking, the rotational speed of the first hydraulic pump Pf becomes lower than that of the second hydraulic pump Pr and therefore, the hydraulic pressure is generated at the first connecting oil path 14 by the difference between the delivery amount from the third port 12 of the second hydraulic pump Pr and the suction amount from the first port 10 of the first hydraulic pump Pf. At this occasion, the third one way valve 22 is closed and therefore, the multiple disc clutch C is engaged via the first one way valve 19 of the third connecting oil path 17 and the braking force of the front wheels Wf, Wf is transmitted to the rear wheels Wr, Wr.

In moving the vehicle rearward as explained above, the second port 11 of the first hydraulic pump Pf becomes the delivery port and the fourth port 13 of the second hydraulic pump Pr becomes the suction port and therefore, the spool 31 of the spool valve 32 is always maintained at the illustrated right position. At this occasion, even when the spool 31 is locked to the left position by some cause, the delivery pressure from the second port 11 of the first hydraulic pump Pf is hampered by the fifth one way valve 34 to operate to the port 33a of the spool valve 32 to push back the locked spool 31 to the right position which is the normal position. At this occasion, even when locking of the spool 31 is not resolved, the hydraulic pressure generated at the second connecting oil path 15 is escaped from the second relief valve 28 via the fourth connecting oil path 18 and therefore, an excess load is not applied to the first hydraulic pump Pf.

The above-explained multiple disc clutch C is engaged by moving the clutch piston 47 forward by oil supplied to the operational hydraulic chamber 16 and pressing the clutch plates 43 . . . , 44 . . . by the pressing portion 66 of the second cam member 63 of the torque cam mechanism 61 pressed in the axial direction via the endplate 71. At this occasion, the torque cam mechanism 61 interposed between the clutch piston 47 and the clutch plates 43 . . . , 44 . . . achieves the following function.

As described in explaining the structure of the hydraulic circuit, in accelerating the vehicle forward, in accelerating the vehicle rearward and in decelerating the vehicle rearward, torque is transmitted between the front wheels Wf, Wf and the rear wheels Wr, Wr by engaging the multiple disc clutch C, and only in decelerating the vehicle forward, the multiple disc clutch C is not engaged and the torque is not transmitted between the front wheels Wf, Wf and the rear wheels Wr, Wr. As described above, the torque cam mechanism 61 is also provided with the function of the one way cam, in accelerating the vehicle forward, the first cam member 62 and the second cam member 63 are relatively rotated from the state of FIG. 4A to the state of FIG. 4B and the thrust force f for engaging the multiple disc clutch C is generated. Therefore, at an initial stage in accelerating the vehicle forward which occurs with a high frequency in running the vehicle, the torque cam mechanism 61 is operated to assist to engage the multiple disc clutch C by the hydraulic pressure and the response shifting to the four wheel drive state can be promoted. In FIG. 5, a bold line indicates a torque transmitting characteristic of the multiple disc clutch C according to the embodiment and a broken line indicates a torque transmitting characteristic of a multiple disc clutch of a prior art which is not provided with a torque cam mechanism and a hatched portion corresponds to an assist torque by the torque cam mechanism 61.

Further, the force of engaging the multiple disc clutch C generated by the torque cam mechanism 61 is gradually reduced in accordance with an increase in the force of engaging the multiple disc clutch C generated by the hydraulic pressure and therefore, differential lock can be avoided from being brought about by preventing the multiple disc clutch C from being completely engaged only by the torque cam mechanism 61.

Further, in decelerating the vehicle forward, the multiple disc clutch C is not engaged by the hydraulic pressure and further, the directions of relatively rotating the first and the second cam members 62, 63 are reversed and therefore, the thrust force f for engaging the multiple disc clutch C by the torque cam mechanism 61 is not generated by the function of the one way cam. Therefore, in decelerating the vehicle rearward, a two wheel drive state is maintained, interference with an ABS apparatus is avoided and function of braking the vehicle is ensured.

Further, although in accelerating the vehicle rearward, the multiple disc clutch C is engaged by the hydraulic pressure, the thrust force f for engaging the multiple disc clutch C by the torque cam mechanism 61 is not generated by the function of the one way cam. Therefore, the torque transmitting characteristic of the multiple disc clutch C according to the embodiment becomes the same as a characteristic of the prior art shown by the broken line in FIG. 5.

Further, in decelerating the vehicle rearward, the multiple disc clutch C is engaged by the hydraulic pressure and further, the thrust force f for engaging the multiple disc clutch C by the torque cam mechanism 61 is generated by the function of the one way cam and therefore, there is brought about a state of assisting to engage the multiple disc clutch C by the hydraulic pressure by the thrust force f of the torque cam mechanism 61. Therefore, the torque transmitting characteristic of the multiple disc clutch C according to the embodiment becomes the same as the characteristic in accelerating the vehicle forward shown by the bold line in FIG. 5.

Further, at an initial stage of accelerating the vehicle forward which occurs with a practically high frequency of occurrence, the multiple disc clutch C is engaged by both of the torque cam mechanism 61 and the hydraulic pressure, the response of bringing the vehicle into the four wheel drive state is promoted and the sufficient drive force can be distributed to the rear wheels Wr, Wr and interference with the ABS apparatus can be avoided by maintaining the vehicle in the two wheel drive state in decelerating the vehicle forward which occurs similarly with a practically high frequency of occurrence.

Further, although even when the torque cam mechanism 61 is operated to bring about the state of FIG. 4B and relative rotation of the first cam member 62 and the second cam member 63 is restricted, relative rotation of the front wheels Wf, Wf and the rear wheels Wr, Wr continues, the friction clutch 67 is slipped and relative rotation of the clutch hub 42 and the second cam member 63 is permitted and therefore, an excess load is not operated to the torque cam mechanism 61.

Meanwhile, although in running the vehicle forward at a constant speed, the rotational speed of the front wheels Wf, Wf and the rotational speed of the rear wheels Wr, Wr are to be the same, there is a case in which the rotational speed of the front wheels Wf, Wf exceeds the rotational speed of the rear wheels Wr, Wr by a difference in a small slip rate between the front wheels Wf, Wf and the rear wheels Wr, Wr by running resistance or the like, at this occasion, there poses a problem that when the multiple disc clutch C is engaged to bring about the unnecessary four wheel drive state, a fuel consumption amount of the engine is increased. However, according to the embodiment, the gear ratio $\alpha$ of the first gear mechanism 4 from the front wheels Wf, Wf to the input shaft 8 of the multiple disc clutch C is set to be smaller than the gear ratio $\beta$ of the second gear mechanism 5 from the rear wheels Wr, Wr to the output shaft 9 of the multiple disc clutch C ($\alpha<\beta$) and therefore, even when the rotational speed of the front wheels Wf, Wf more or less exceeds the rotational speed of the rear wheels Wr, Wr, the multiple disc clutch C is not engaged and the fuel consumption of the engine can be prevented from being increased by bringing about the unnecessary four wheel drive state. Further, a frequency of bringing about the four wheel drive state is reduced and therefore, it is not necessary to set excessive strength for ensuring durability of the drive system to be able to contribute to a reduction in the weight of the drive system and a reduction in cost and also able to promote durability of the multiple disc clutch C.

In FIG. 6, the abscissa designates a difference between the rotational speeds of the front wheels Wf, Wf and the rear wheels Wr, Wr and the ordinate designates the transmitting torque of the multiple disc clutch C. As is apparent by comparing FIG. 6 with FIG. 5, in which the abscissa designates a difference between the rotational speeds of the input shaft 8 and the output shaft 9 of the multiple disc clutch C and the ordinates designates the transmitting torque of the multiple disc clutch C, according to the embodiment, it is known that the multiple disc clutch C does not generate the transmitting torque even when the rotational speed of the front wheels Wf, Wf more or less exceeds the rotational speed of the rear wheels, Wr, Wr. Particularly, according to the multiple disc clutch C having the torque cam mechanism 61, the transmitting torque rapidly rises at an instance of generating the difference between the rotational speeds of the input shaft 8 and the output shaft 9 and therefore, the effect of preventing the multiple disc clutch C from being engaged in running the vehicle forward at a constant speed becomes further significant.

Although the embodiment of the invention is explained as above, according to the invention, design can variously be changed within the range not deviated from gist thereof.

What is claimed is:

1. A power transmission apparatus of a four wheel drive vehicle including a front wheel (Wf) to which a drive force of an engine (E) is directly transmitted, and a rear wheel (Wr) to which a portion of the driving force of the engine (E) is indirectly transmitted via a multiple disc clutch (C), wherein the multiple disc clutch (C) is engaged by a hydraulic pressure generated by hydraulic pumps (Pf, Pr) in accordance with a difference between rotational speeds of the front wheel (Wf) and the rear wheel (Wr);

the power transmission apparatus comprising:
   a torque cam mechanism including
      a first cam member (62) moved in cooperation with rotation of the front wheel (Wf), and
      a second cam member (63) moved in cooperation with rotation of the rear wheel (Wr),
   the multiple disc clutch (C) being engaged by a thrust force in an axial direction generated in accordance with a difference between rotational speeds of the first cam member (62) and the second cam member (63), wherein
      the torque cam mechanism (61) generates the thrust force when the rotational speed of the front wheel (Wf) exceeds the rotational speed of the rear wheel (Wr) in running the vehicle forward, and does not generate the thrust force when the rotational speed of the rear wheel (Wr) exceeds the rotational speed of the front wheel (Wf) in running the vehicle forward, and
      a gear ratio ($\beta$) of a second gear mechanism (5) for transmitting rotation of the rear wheel (Wr) to the second cam member (63) via a second differential apparatus (6) is set to be larger than a gear ratio ($\alpha$) of a first gear mechanism (4) for transmitting rotation of the front wheel (Wf) to the first cam member (62) via a first differential apparatus (2).

2. The power transmission apparatus of a four wheel drive vehicle according to claim 1, wherein the difference between rotational speeds is 0.5%~1.0%.

* * * * *